Figure 1:
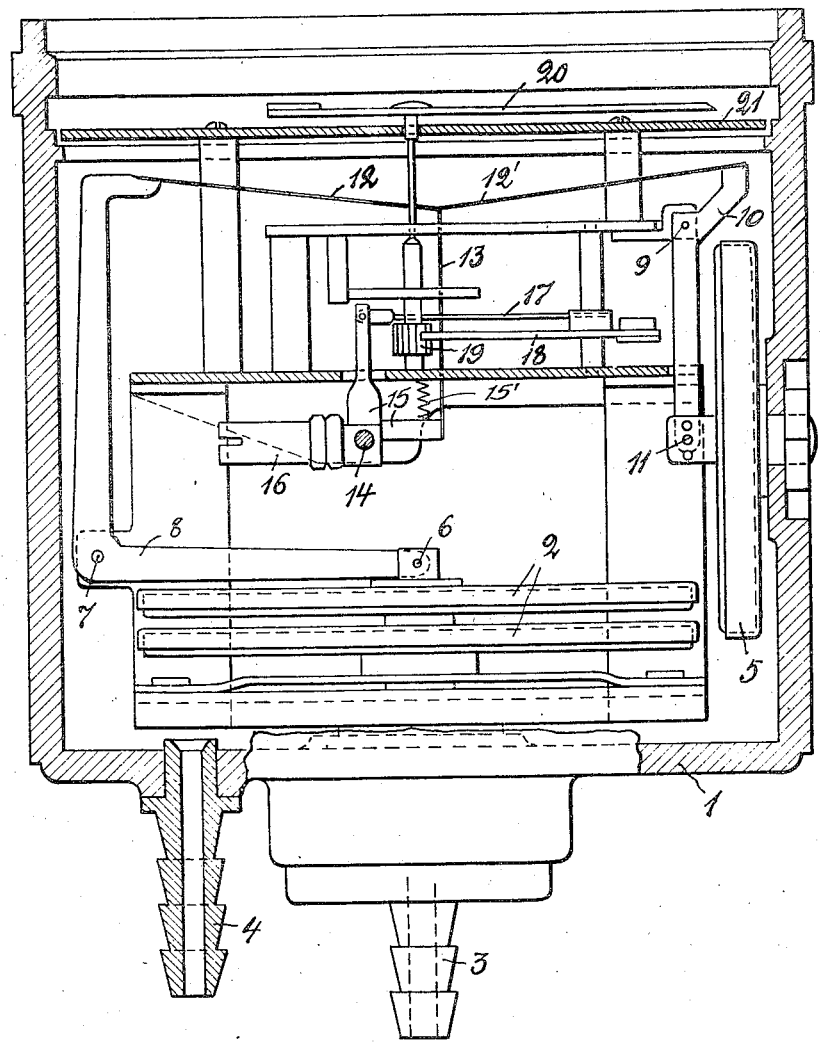

Nov. 24, 1942.   J. G. PAULIN   2,302,713
SPEEDOMETERS, PARTICULARLY FOR AIRCRAFT
Filed July 8, 1940   3 Sheets-Sheet 1

Inventor,
J. G. Paulin
By: Glascock Downing & Seebold
Attys.

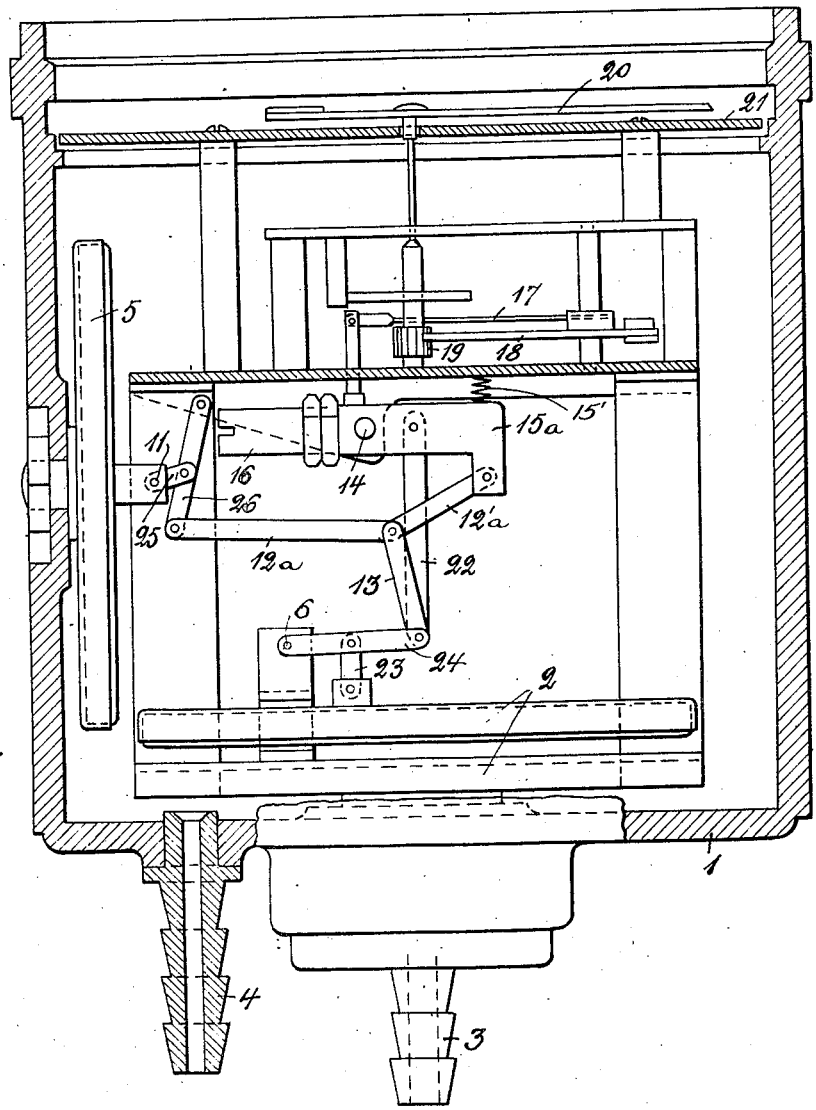

Patented Nov. 24, 1942

2,302,713

UNITED STATES PATENT OFFICE 2,302,713

SPEEDOMETER, PARTICULARLY FOR AIRCRAFT

Josua Gabriel Paulin, Nockeby, Sweden

Application July 8, 1940, Serial No. 344,439
In Sweden September 18, 1939

5 Claims. (Cl. 73—182)

The object of the present invention is a velocity meter for the measuring of the velocity of flow of a gaseous medium or other medium of variable density flowing past the meter or relatively thereto, and the invention is particularly intended to be brought into use for the measuring of the speed of an aircraft relatively to the surrounding air. The speedometer according to the invention is of the type wherein a pressure of flow or speed created within a Pitot-tube, Venturi-tube or the like is caused to actuate a diaphragm connected to an indicating or pointer mechanism. Since the pressure of flow or speed is highly dependent on the density of the medium, the deflection of the pointer of a speedometer of this description will be subjected to great variations with the static pressure unless measures for compensation are undertaken, and in an aircraft such pointer deflection will at a constant speed be so much less the greater the altitude of the craft is above ground. With an increasing altitude the static pressure will not diminish linearly but more rapidly, to begin with, and then more and more slowly. To provide for correction of the wrong indication increasing with the altitude relatively to the reading at the ground, use may be made of a curve diagram indicating the necessary corrections for different altitudes, but this expedient will be found to be rather inconvenient. It is desirable, therefore, to provide the speedometer with a compensating means adapted to make correction directly for the wrong indication caused by the change of the static pressure, so that the proper speed may be read directly off the dial of the instrument.

According to the present invention, such compensation for the dependence of the pressure of flow or speed on the density of the medium is effected by the fact that an auxiliary diaphragm or the like responding to the static pressure of the medium is connected in a counter-operative manner to the pointer mechanism through a gearing having a variable ratio of gear under the influence of the main diaphragm, that is to say the diaphragm actuated by the pressure of flow, in a manner such that the ratio of gear is increased with the velocity of flow or speed. Preferably, the variable gearing consists of two filaments or links connected pivotally and preferably at an obtuse angle with each other, one end of the filament or link system being connected to the auxiliary diaphragm, and the other end and the apex of the angle being connected to the main diaphragm and the pointer mechanism respectively, or vice versa. As will appear from the above, the compensating means is so constructed that the correction of the pointer deflection brought about for a certain change of the static pressure is so much greater the greater speed is, which is all in agreement with the requirements set up.

The invention will be described more closely with reference to the accompanying drawings which illustrate three different forms of embodiment of speedometers adapted for the measuring of the speed of an aircraft relatively to the air.

In the embodiment shown in Figure 1, the parts of the speedometer are mounted within a closed casing 1. Arranged on the bottom of the casing 1 is a system of series-connected aneroid diaphragm boxes 2, the interior of which may be connected in a manner known per se to a Pitot-tube by means of a tubing threaded onto a pipe socket or nozzle 3 depending from the casing. This aneroid system represents the main diaphragm system responding to the pressure of speed. The interior of the casing, that is to say the air about the diaphragm boxes, may be connected in a manner likewise known per se to a suitably selected point of the Pitot tube system by means of a tube joint connected to the nozzle 4, so that the pressure within the casing is maintained equal to the prevalent external atmospheric pressure. Mounted to the right within the casing is an auxiliary diaphragm box 5 responding to this atmospheric pressure. A bell crank lever 8 mounted in the frame as at 7 is connected to the main diaphragm system 2 by means of a pin 6. In a like manner, a bell crank lever 10 mounted in the frame at 9 is connected to the auxiliary diaphragm system 5 by means of a pin connection 11. If desired, short links may be arranged between each diaphragm system and the appertaining bell crank lever, although the diaphragms generally possess sufficient flexibility to yield to the tendency toward breaking on deflection. The upper ends of the levers 8 and 10 are interconnected by means of two coherent flexible bands or filaments 12, 12', which are stretched at an obtuse angle mutually by the fact that a further flexible metal band or the like 13 connecting the point of union of the ribbons 12, 12' with the one arm of a bell crank lever 15 mounted in the frame at 14 is always kept taut by means of a spring 15' acting upon the bell crank lever. The bell crank lever 15 is provided with a balancing counter-weight 16, and is connected in known manner to a pointer 20 by means of a link 17, a toothed sector 18, and a gear wheel 19, the point of said pointer moving over a dial 21.

The band system 12, 12' 13 may be said to represent a variable gearing connected intermediate the auxiliary diaphragm box and the pointer mechanism, the ratio of gear of such gearing augmenting according as the obtuse angle between the bands 12 and 12' increases. If the aircraft is moving obliquely upwardly at a constant rate of speed, so that the static pressure will consequently diminish successively, the aneroid system 2 will be compressed by reason of the lessened pressure of speed, the bell crank lever 8 being thus turned in a clockwise direction. If the right hand end of the band system 12, 12' were fixed, the obtuse angle between the bands 12 and 12' would be decreased, and in spite of the speed being kept constant the pointer would then indicate lower and lower values of speed. On account of the reduced static pressure, however, the aneroid box 5 will expand so that the bell crank lever 10 is turned in a clockwise direction, and the right hand end of the band system 12, 12' is moved to the right. If the right hand ends of the two bell crank levers are then moved to the right by the same amount, the angle of the band system will be kept unaltered and the pointer remains practically unactuated. If, instead, the aircraft is moving obliquely downwardly at a uniform speed, the two bell crank levers 8 and 10 will conversely be turned in a counter-clockwise direction, while the obtuse angle remains approximately unchanged, as before.

The greater the constant speed, the tauter will the band system 12, 12' be, that is to say, the more obtuse is the angle formed by the two bands. On the other hand, as stated above, the ratio of gear with which the aneroid box 5 actuates the pointer is so much greater the more obtuse said angle is. From this it consequently follows that the correction of the pointer deflection obtained for a certain definite change of the static pressure will be so much greater the greater the speed of the air craft is, which is a necessary condition for the correction becoming true. If desired, the bands 12, 12', 13 may be replaced by rigid links.

As will be seen from the drawings, the upwardly projecting arm of the bell crank lever 10 is positioned obliquely with respect to the band 12' connected therewith, in a manner such that the direction thereof approaches the direction of the band in the same proportion as the speed decreases, whereby the said ratio of gear at which the auxiliary diaphragm box 5 actuates the pointer mechanism is rendered further dependent upon the speed. By this means a more accurate compensation is made possible within the whole measuring range. By suitably selecting the magnitude of the obtuse angle for zero speed at a normal barometer pressure, and by adapting the oblique positioning of the upwardly projecting arm of the bell crank lever 10, it is possible to reach condition such that the instrument will indicate properly both at the lowest rate of speed which the craft is capable of holding, for instance 100 kilometers per hour, and also at the maximum speed. Between the corresponding points on the dial the latter may be divided approximately uniformly at a suitable ratio of gear of the pointer mechanism itself.

Since the pressure of speed created within the Pitot-tube does not rise linearly with the speed, and since by reason of this it might be difficult to attain a linear correlation between speed and pointer deflection, further compensating means may become necessary where any great accuracy in the instrument is demanded. To this end various means known per se may be brought into use.

Figure 2:
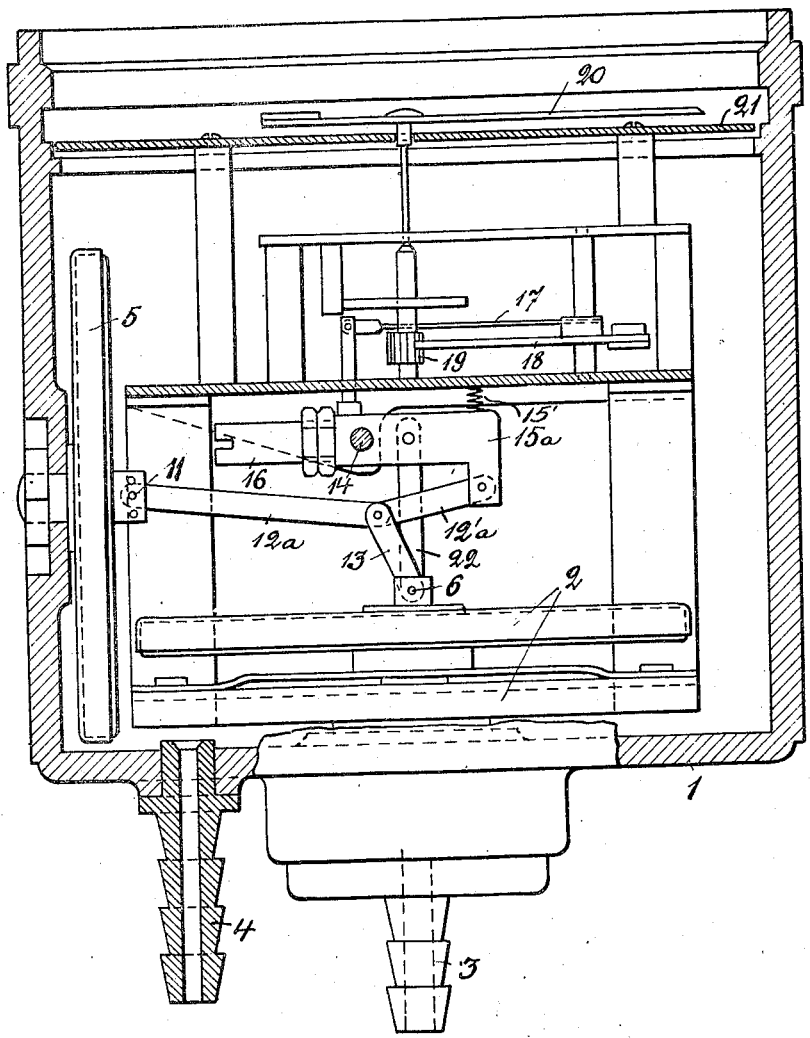

In the embodiment according to Figure 2, both of the bands or filaments 12, 12' stretched at an obtuse angle to each other in Fig. 1 have been replaced by two rigid links designated 12a and 12'a, said links being here connected directly between the auxiliary diaphragm box 5 and the bell crank lever 15a of the pointer mechanism. The obtuse apex of the angle is connected to the main diaphragm system 2 through a short link 13 as at 6. The main diaphragm system 2 is in turn connected directly to the lever 15a of the pointer mechanism through a link 22. Otherwise, the arrangement is similar to that in the previously described case.

Whereas in Figure 1, the band system 12, 12', 13 constitutes a connection to the pointer mechanism which is common to the main diaphragm system 2 and the auxiliary diaphragm system 5, and is adapted to transfer the movements of both diaphragm systems to the pointer mechanism, the link system 12a, 12'a of Figure 2, on the other hand, only forms a variable gearing for the auxiliary diaphragm system, while a certain link 22 serves to transfer the movements of the main diaphragm system to the pointer mechanism. The connection through the link 13 between the main diaphragm system and the obtuse apex of the angle serves to bring about the change of the ratio of gear according to the invention between the auxiliary diaphragm system and the pointer mechanism in dependence on the speed.

When at an increasing speed the aneroid boxes of the main diaphragm system are expanded, the lever 15a is caused to be turned in a counter-clockwise direction through the agency of the link 22. At the same time the link 13 raises the point of union between the links 12a and 12'a, whereby the resulting moment arm by which the auxiliary diaphragm system 5 actuates the pointer mechanism is diminished. Thus a similar result will be obtained as according to Figure 1, i. e. that the ratio of gear between the auxiliary diaphragm system and the pointer mechanism is augmented at an increasing speed, whereby the magnitude of the correction is augmented with the speed in accordance with the requirements. By the successive straightening-out effect which the linkage system 12a, 12'a is subjected to at an increasing speed the auxiliary diaphragm box will obviously be compressed to some extent even if the static pressure should be constant in the meantime, but this does not entail any practical inconvenience.

If the static pressure falls while the craft is moving at a constant rate of speed, the main diaphragm boxes 2 will tend to contract, whereas the auxiliary diaphragm box 5 tends to expand. With proper adjustment of the link system and of the lengths of those moment arms by which the two diaphragm systems act upon the pointer mechanism both of said tendencies balance one another, and the pointer remains unactuated by the change of the air pressure.

The embodiment according to Figure 3 differs from that shown in Figure 2 only in that the movements of each diaphragm system 2 and 5 respectively are transferred to the link system 12a, 12'a, 13 through the intermediary of somewhat obliquely positioned links 24 and 26 respectively mounted in the frame and connected approximately at the center thereof with the appertaining diaphragm through short links, 23 and 25 respectively. By suitably choosing the length and the obliquity of the additional links it will be possible to increase the accuracy of the correction.

Obviously, the invention is not limited to the forms of embodiment as illustrated, but permits of various modifications within the scope of the inventive idea.

I claim:

1. In an instrument for measuring the flow of a medium having a pressure-dependent density in combination, a measuring member responsive to the flow of medium, an indicator device, a compensating member responsive to the static pressure of said medium, a transmission device consisting of three links connected together at a common center, two of said links being connected at their outer ends to said measuring member and said indicator device respectively, and the third of said links being connected at its outer end to said compensating member in such manner that the movement of the compensating member upon increase of static pressure tends to reduce the magnitude of the indication of flow.

2. In an instrument for measuring the flow of a medium having a pressure-dependent density in combination, a measuring member responsive to the flow of medium, an indicator device, a compensating member responsive to the static pressure of said medium, a transmission device consisting of three elongated flexible members connected together at a common center, two of said flexible members being connected at their outer ends to said measuring member and said indicator device respectively, and the third of said flexible members being connected at its outer end to said compensating member, and a spring biasing said indicator device so as to maintain said flexible members in stretched condition, the interconnection between said third flexible member and said compensating member being so devised that the movement of the compensating member upon increase of static pressure tends to reduce the magnitude of the indication of flow.

3. In an instrument for measuring the flow of a medium having a pressure-dependent density in combination, a measuring member responsive to the flow of medium, an indicator device, a compensating member responsive to the static pressure of said medium, a lever operatively connected with said compensating member, a transmission device consisting of three links connected together at a common center, two of said links being connected at their outer ends to said measuring member and said indicator device respectively, and the third of said links being connected at its outer end to one arm of said lever in such manner that the movement of the compensating member upon increase of the static pressure tends to reduce the magnitude of indication of flow and that the direction of the said lever arm approaches the direction of the link at diminishing velocity of flow.

4. An instrument according to claim 1, in which a lever is interconnected between the measuring member and the transmitting device.

5. An instrument according to claim 1, in which a lever is interconnected between the indicator device and the transmitting device.

JOSUA GABRIEL PAULIN.